United States Patent
Tseng et al.

(10) Patent No.: US 10,885,595 B2
(45) Date of Patent: Jan. 5, 2021

(54) FOOD DEPOSITING SYSTEM

(71) Applicant: HONGFUJIN PRECISION ELECTRONICS (TIANJIN) CO., LTD., Tianjin (CN)

(72) Inventors: Shih-Yin Tseng, New Taipei (TW); Po-Hsiang Chen, New Taipei (TW); Cheng-Yu Wang, New Taipei (TW)

(73) Assignee: HONGFUJIN PRECISION ELECTRONICS (TIANJIN) CO., LTD., Tianjin (CN)

( * ) Notice: Subject to any disclaimer, the term of this patent is extended or adjusted under 35 U.S.C. 154(b) by 333 days.

(21) Appl. No.: 15/990,920

(22) Filed: May 29, 2018

(65) Prior Publication Data

US 2019/0325536 A1 Oct. 24, 2019

(30) Foreign Application Priority Data

Apr. 19, 2018 (CN) .......................... 2018 1 0355213

(51) Int. Cl.
| | | |
|---|---|---|
| *G06Q 50/12* | (2012.01) | |
| *G09B 19/00* | (2006.01) | |
| *G06K 9/00* | (2006.01) | |
| *G06Q 30/06* | (2012.01) | |

(52) U.S. Cl.
CPC ......... *G06Q 50/12* (2013.01); *G06K 9/00288* (2013.01); *G06Q 30/0631* (2013.01); *G09B 19/0092* (2013.01)

(58) Field of Classification Search
CPC ........ G06Q 30/00; G06Q 30/06; G06Q 50/00; G06Q 10/08; G06Q 20/18; G06F 19/00; G06F 17/009

USPC ................... 705/306, 14.37, 13, 15; 235/375
See application file for complete search history.

(56) References Cited

U.S. PATENT DOCUMENTS

| | | | | |
|---|---|---|---|---|
| 6,028,517 | A * | 2/2000 | Sansone | A47G 29/1212 232/34 |
| 8,195,511 | B2 * | 6/2012 | Bowles | G06Q 10/30 705/14.37 |
| 9,640,009 | B1 * | 5/2017 | Sears | G07G 5/00 |
| 9,965,798 | B1 * | 5/2018 | Vaananen | F25D 27/005 |
| 10,157,308 | B2 * | 12/2018 | Ebrom | G06K 9/00771 |
| 10,339,509 | B2 * | 7/2019 | Bordeleau | H04N 5/232 |
| 2002/0153411 | A1 * | 10/2002 | Wan | G07F 17/0092 235/375 |
| 2004/0083201 | A1 * | 4/2004 | Sholl | G06Q 10/06 |
| 2009/0099873 | A1 * | 4/2009 | Kurple | G06F 19/3475 705/3 |

(Continued)

FOREIGN PATENT DOCUMENTS

| | | |
|---|---|---|
| TW | 542197 | 5/2017 |
| TW | 201738770 | 11/2017 |
| TW | 556372 | 3/2018 |

*Primary Examiner* — Olusegun Goyea
(74) *Attorney, Agent, or Firm* — ScienBiziP, P.C.

(57) ABSTRACT

A food depositing system for the benefit of customers and food shops includes a first electronic device. The first electronic device includes a processor and programs stored in a memory. The processor causes the display of an interactive depositing interface during a food depositing operation, the deposited food items being input as deposited items. Identity and certain features of a depositing customer are also obtained during the depositing operation and an association is made accordingly and stored to await the customer's takeback of food deposited.

14 Claims, 3 Drawing Sheets

(56) References Cited

U.S. PATENT DOCUMENTS

| | | | |
|---|---|---|---|
| 2011/0288685 A1* | 11/2011 | Usem | G07F 17/12 700/275 |
| 2015/0017147 A1* | 1/2015 | Gillespie | A61K 33/32 424/94.1 |
| 2015/0032555 A1* | 1/2015 | Jones | G06Q 10/087 705/15 |
| 2015/0356637 A1* | 12/2015 | Graffia, II | G06Q 30/0185 705/306 |
| 2016/0275518 A1* | 9/2016 | Bowles | G07F 7/06 |
| 2016/0335588 A1* | 11/2016 | Knobel | G06F 16/23 |
| 2016/0335616 A1* | 11/2016 | Bordeleau | G06K 7/10425 |
| 2016/0358508 A1* | 12/2016 | Cheatham, III | G09B 19/0092 |
| 2017/0172340 A1* | 6/2017 | Baarman | A47J 31/52 |
| 2017/0221030 A1* | 8/2017 | Clark | G06K 7/10722 |
| 2018/0150685 A1* | 5/2018 | Ebrom | G06K 9/00362 |
| 2018/0247326 A1* | 8/2018 | Cronin | G06K 7/10425 |
| 2019/0236873 A1* | 8/2019 | Estill | G07C 9/00309 |
| 2019/0281878 A1* | 9/2019 | Tang | G16H 50/30 |
| 2019/0287141 A1* | 9/2019 | Bordeleau | G07F 7/06 |

\* cited by examiner

FOOD DEPOSITING SYSTEM

CROSS-REFERENCE TO RELATED APPLICATIONS

This application claims priority to Chinese Patent Application No. 201810355213.4, filed on Apr. 19, 2018, the contents of which are incorporated by reference herein.

FIELD

The subject matter herein generally relates to a food depositing system.

BACKGROUND

Drink depositing service is now common in beverage shops, but most of them record on paper a number of cups of drink for customer. After a long time, a record of the particular customer may be lost.

BRIEF DESCRIPTION OF THE DRAWINGS

Implementations of the present technology will now be described, by way of example only, with reference to the attached figures.

DETAILED DESCRIPTION

Figure 1:
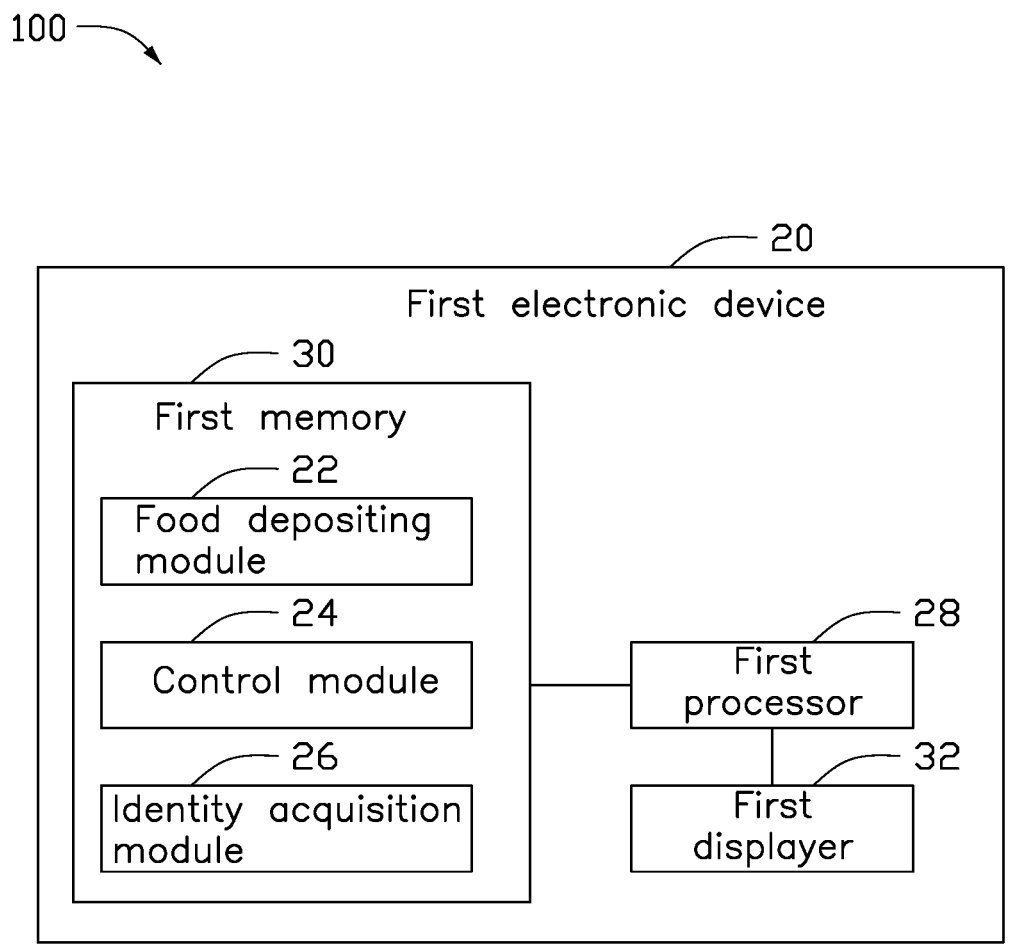
FIG. 1 is a block diagram of a food depositing system.

It will be appreciated that for simplicity and clarity of illustration, where appropriate, reference numerals have been repeated among the different figures to indicate corresponding or analogous elements. In addition, numerous specific details are set forth in order to provide a thorough understanding of the embodiments described herein. However, it will be understood by those of ordinary skill in the art that the embodiments described herein can be practiced without these specific details. In other instances, methods, procedures, and components have not been described in detail so as not to obscure the related relevant feature being described. Also, the description is not to be considered as limiting the scope of the embodiments described herein. The drawings are not necessarily to scale and the proportions of certain parts may be exaggerated to better illustrate details and features of the present disclosure.

The present disclosure, including the accompanying drawings, is illustrated by way of examples and not by way of limitation. It should be noted that references to "an" or "one" embodiment in this disclosure are not necessarily to the same embodiment, and such references mean "at least one."

Furthermore, the term "module", as used herein, refers to logic embodied in hardware or firmware, or to a collection of software instructions, written in a programming language, such as, Java, C, or assembly. One or more software instructions in the modules can be embedded in firmware, such as in an EPROM. The modules described herein can be implemented as either software and/or hardware modules and can be stored in any type of non-transitory computer-readable medium or other storage device. Some non-limiting examples of non-transitory computer-readable media include CDs, DVDs, BLU-RAY, flash memory, and hard disk drives.

FIG. 1 illustrates a food depositing system 100 including a first electronic device 20. The food depositing system 100 is configured to record and manage the depositing of food in a shop. The food depositing system 100 includes a food depositing module 22, a control module 24, and an identity acquisition module 26. The first electronic device 20 includes at least a first processor 28 and a first memory 30. The first processor 28 is configured to process a number of first instructions of the first electronic device 20. The first memory 30 is configured to store the first instructions. The food depositing module 22, the control module 24, and the identity acquisition module 26 are executed in the first electronic device 20.

The food depositing module 22 is configured to display an interactive depositing interface during a depositing operation. The first electronic device 20 includes a first displayer 32. The depositing interactive interface is displayed on the first displayer 32. The depositing interactive interface allows customers to input items deposited. The deposited item includes a name of food and the number of food. The food may be, but is not limited to, a drink or a snack. The control module 24 is configured to control the identity acquisition module 26 to obtain an identity of the customer relevant to the depositing operation. The first memory 30 is configured to associate and store the customer's identity and the deposited items. In an embodiment, the identity of the customer is represented by a face image of the customer. The identity acquisition module 26 includes a camera, and the face image is captured by the camera. The first memory 30 associates and stores the face image and the deposited item. In another embodiment, the identity acquisition module 26 includes a touch screen for acquiring the customer's fingerprint. The first memory 30 associates and stores the fingerprint and the deposited item.

Figure 2:
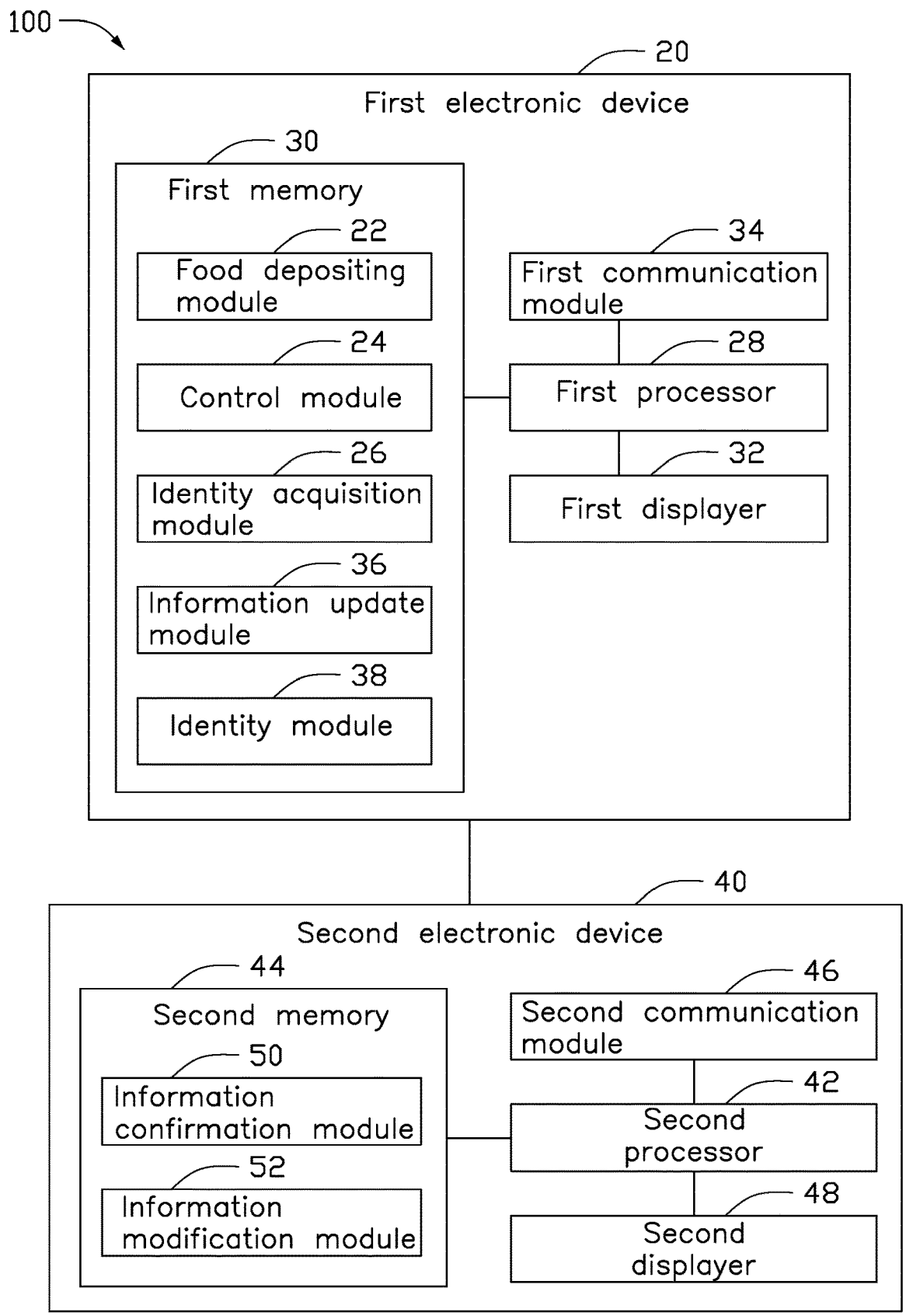
FIG. 2 is a block diagram of a food depositing system according to another exemplary embodiment.

FIG. 2 illustrates that the food depositing system 100 further includes a second electronic device 40 communicating with the first electronic device 20. The first electronic device 20 further includes a first communication module 34. The second electronic device 40 includes at least a second processor 42, a second memory 44, and a second communication module 46. The second processor 42 is used for calculating and processing a number of second instructions of the second electronic device 40. The second memory 44 is used to store the number of second instructions of the second electronic device 40. The second communication module 46 is configured to communicate with the first communication module 34. The first communication module 34 is configured to transmit the deposited item and the identity to the second electronic device 40. The second electronic device 40 includes a second displayer 48. The second displayer 48 is used to display the deposited item and the identity in real time.

The food depositing system 100 also includes an information confirmation module 50 executed in the second electronic device 40. The information confirmation module 50 is configured to confirm the deposited item and the identity according to a confirmation operation and store the confirmed deposited item and the confirmed identity in the second memory 44. The second communication module 46 is configured to transmit the confirmed deposited item and the confirmed identity to the first electronic device 20. The food depositing system 100 further includes an information update module 36 executed in the first electronic device 20. According to the confirmed deposited item and the identity, the information updating module 36 updates the corresponding deposited item already stored in the first memory 30. The food depositing system 100 further includes an information modification module 52 executed in the second electronic device 40. The information modification module 52 is configured to modify the deposited item or items.

The food depositing system 100 further includes an identification module 38 executed in the first electronic device 20. According to a takeback food operation of a customer, the identity acquisition module 26 acquires the identity of the customer. The identity module 38 is used to identify whether the identity of the customer corresponding to the takeback food operation is consistent with the stored identity of a customer. The first displayer 32 further displays an error message when the identity of the customer corresponding to the takeback food operation does not match the stored identity of a customer. The first displayer 32 displays the interactive depositing interface when the identity of the customer corresponding to the takeback food operation is consistent with the stored identity of a customer, and the depositing interactive interface includes the deposited item corresponding to the identity of the customer. The depositing interface is for the customer to input the food to be taken back. The information updating module 36 is further configured to update the customer's deposited items according to the customer's previously deposited item and the food taken back.

Figure 3:
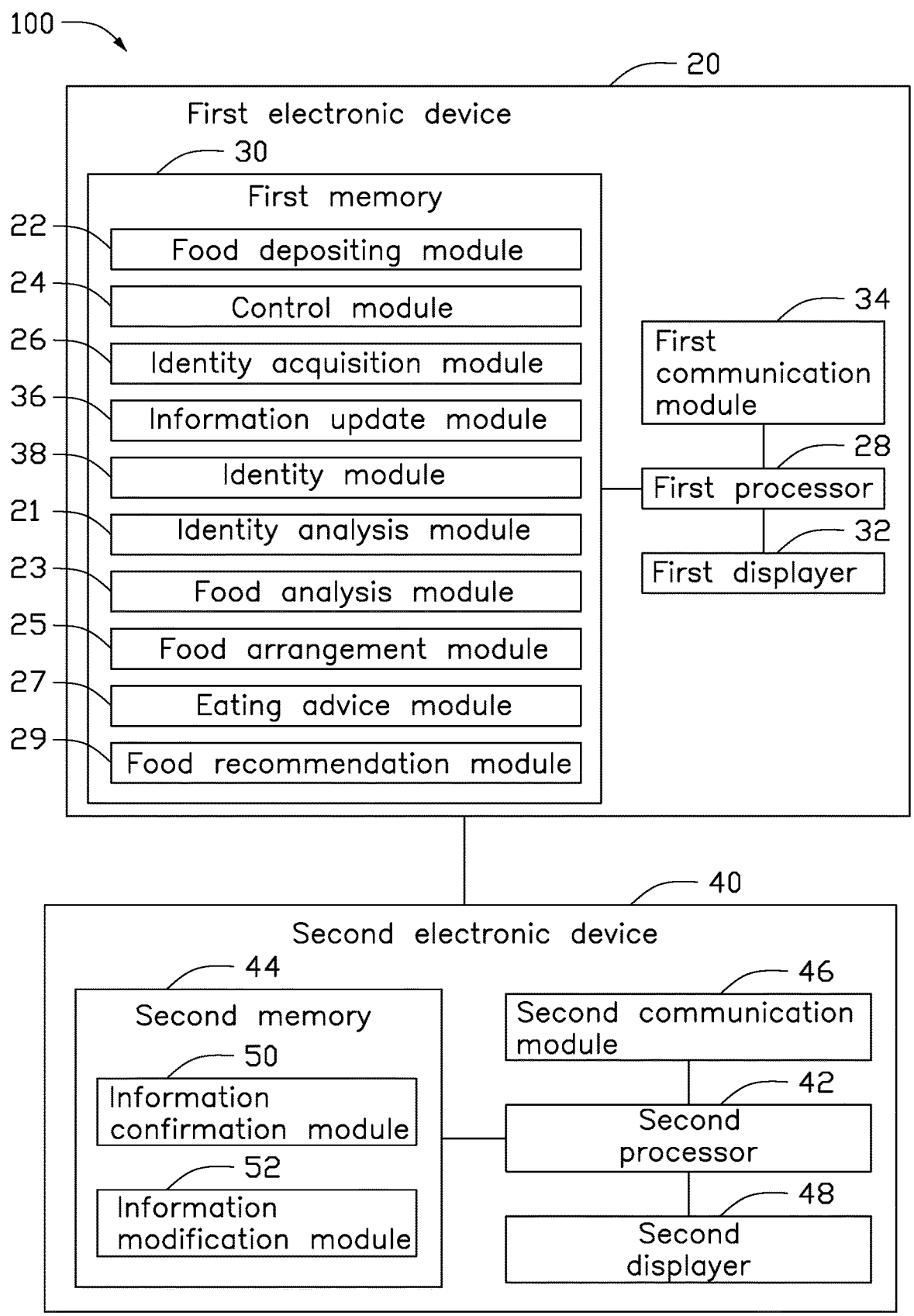
FIG. 3 is a block diagram of a food depositing system according to another exemplary embodiment.

FIG. 3 illustrates that the food depositing system 100 further includes an identity analysis module 21, a food analysis module 23, and a food arrangement module 25 executed in the first electronic device 20. The identity analysis module 21 is used to analyze the identity and determine a features of such identity. The features as to identity can include, but are not limited to, age and gender. The food analysis module 23 is configured to analyze a degree of compliance of the deposited items with the customer's features according to a predetermined rule. The predetermined rule can include, but is not limited to, an equivalence between age of customer and number of calories of food which is available to be taken back. The food arrangement module 25 is configured to arrange foods of the deposited items according to such equivalence.

The food depositing system 100 further includes an eating advice module 27 executed in the first electronic device 20. The eating advice module 27 is configured to give a food consumption advice according to the identity features of the customer. The advice includes an accessories information or degrees of hot and cold. The accessories information includes for example an amount of sugar in deposited items.

The food depositing system 100 further includes a food recommendation module 29. The food recommendation module 29 is configured to determine a food that the customer tends to purchase according to previously deposited items of the customer and a food stock of the shop and recommend a determined food or similar food to the customer. The food recommendation module 29 is further used for recommending to the customer a food being promoted.

The exemplary embodiments shown and described above are only examples. Even though numerous characteristics and advantages of the present technology have been set forth in the foregoing description, together with details of the structure and function of the present disclosure, the disclosure is illustrative only, and changes may be made in the details, including in matters of shape, size, and arrangement of the parts within the principles of the present disclosure, up to and including the full extent established by the broad general meaning of the terms used in the claims.

What is claimed is:

1. A food depositing system comprising:
a first electronic device comprising:
   a first displayer;
   a first memory that stores one or more first programs;
   at least one first processor; and
   the one or more first programs when executed by the at least one first processor, cause the at least one first processor to:
   display an interactive depositing interface according to a depositing operation on the first displayer, the interactive depositing interface configured to input items deposited;
   obtain an identity of a customer according to the depositing operation; and
   associate and store the customer's identity and the deposited items;
   transmit the deposited item and the identity to a second electronic device;
the second electronic device comprising:
   a second displayer;
   a second memory that stores one or more second programs;
   at least one second processor; and
   the one or more second programs when executed by the at least one second processor, cause the at least one second processor to:
   display the deposited item and the identity in real time on the second displayer;
   confirm the deposited item and the identity according to a confirmation operation and store the confirmed deposited item and the confirmed identity in the second memory; and
   transmit the confirmed deposited item and the confirmed identity to the first electronic device;
wherein the at least one first processor is further caused to:
   update corresponding deposited item already stored in the first memory according to the confirmed deposited item and the confirmed identity;
   acquire the identity of a customer according to a takeback food operation of the customer;
   identify whether the identity of the customer corresponding to the takeback food operation is consistent with the stored identity of a customer;
   display the interactive depositing interface when the identity of the customer corresponding to the takeback food operation is consistent with the stored identity of a customer, wherein the interactive depositing interface comprises the deposited item corresponding to the identity of the customer, and the interactive depositing interface is for the customer to command a take-back of the food;
   analyze the identity and determine features of the customer, the features comprising age and gender;
   analyze a degree of compliance of the deposited item with the customer's features according to a predetermined rule, the predetermined rule comprising an equivalence between age of customer and number of calories of food which is available to be taken back; and
   arrange foods of the deposited item which is available to be taken back on the first displayer according to the degree of compliance.

2. The food depositing system of claim 1, wherein the identity is a face image of the customer, the face image is captured by a camera.

3. The food depositing system of claim 1, wherein the deposited item comprises a name of food and the number of food, the food is a drink or a snack.

4. The food depositing system of claim 3, wherein the at least one second processor is further caused to: modify the deposited item.

5. The food depositing system of claim 1, wherein the at least one first processor is further caused to: update the customer's deposited item according to the customer's previously deposited item and the taken back food.

6. The food depositing system of claim 1, wherein the at least one first processor is further caused to: give a food consumption advice according to the features of the customer, the advice comprises an accessories information and degrees of hot and cold, the accessories information comprises an amount of sugar in deposited items.

7. The food depositing system of claim 1, wherein the at least one first processor is further caused to:
determine a food that the customer tends to purchase according to previously deposited item of the customer and a food stock of a shop; and
recommend the determined food and a food being promoted to the customer.

8. A food depositing system comprising:
a first electronic device comprising:
a first displayer;
a first memory that stores one or more first programs;
at least one first processor; and
the one or more first programs when executed by the at least one first processor, cause the at least one first processor to:
display an interactive depositing interface for inputting items deposited on the first displayer;
obtain an identity of a customer according to a depositing operation;
generate a relationship between the customer's identity and the deposited items; and
store the relationship in the first memory;
transmit information as to the deposited item and the identity to a second electronic device;
the second electronic device comprising:
a second displayer;
a second memory that stores one or more second programs;
at least one second processor; and
the one or more second programs when executed by the at least one second processor, cause the at least one second processor to:
display the deposited item and the identity in real time on the second displayer;
confirm the deposited item and the identity according to a confirmation operation and store the confirmed deposited item and the confirmed identity in the second memory; and
transmit the confirmed deposited item and the confirmed identity to the first electronic device;
wherein the at least one first processor is further caused to:
update corresponding deposited item already stored in the first memory according to the confirmed deposited item and the confirmed identity;
acquire the identity of a customer according to a takeback food operation of the customer;
identify whether the identity of the customer corresponding to the takeback food operation is consistent with the stored identity of a customer;
display the interactive depositing interface when the identity of the customer corresponding to the takeback food operation is consistent with the stored identity of a customer, wherein the interactive depositing interface comprises the deposited item corresponding to the identity of the customer, and the interactive depositing interface is for the customer to command a take-back of the food;
analyze the identity and determine features of the customer, the features comprising age and gender;
analyze a degree of compliance of the deposited item with the customer's features according to a predetermined rule, the predetermined rule comprising an equivalence between age of customer and number of calories of food which is available to be taken back; and
arrange foods of the deposited item which is available to be taken back on the first displayer according to the degree of compliance.

9. The food depositing system of claim 8, wherein the identity is a face image of the customer, the face image is captured by a camera.

10. The food depositing system of claim 8, wherein the deposited item comprises a name of food and the number of food, the food is a drink or a snack.

11. The food depositing system of claim 10, wherein the at least one second processor is further caused to: modify the deposited item.

12. The food depositing system of claim 8, wherein the at least one first processor is further caused to: update the customer's deposited item according to the customer's previously deposited item and the taken back food.

13. The food depositing system of claim 8, wherein the at least one first processor is further caused to: give a food consumption advice according to the feature of the customer.

14. The food depositing system of claim 8, wherein the at least one first processor is further caused to:
determine a food that the customer tends to purchase according to previously deposited item of the customer and a food stock of a shop; and
recommend the determined food and a food being promoted to the customer.

* * * * *